United States Patent
Walker et al.

(10) Patent No.: US 7,657,225 B2
(45) Date of Patent: Feb. 2, 2010

(54) METHOD TO MINIMIZE COMPATIBILITY ERROR IN HIERARCHICAL MODULATION USING VARIABLE PHASE

(75) Inventors: Glenn A. Walker, Greentown, IN (US); Eric A. DiBiaso, Kokomo, IN (US); Michael L. Hiatt, Jr., Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 619 days.

(21) Appl. No.: 11/474,747

(22) Filed: Jun. 26, 2006

(65) Prior Publication Data

US 2006/0276145 A1      Dec. 7, 2006

Related U.S. Application Data

(63) Continuation-in-part of application No. 10/974,279, filed on Oct. 27, 2004, now abandoned.

(60) Provisional application No. 60/525,616, filed on Nov. 26, 2003.

(51) Int. Cl.
*H04H 40/00* (2008.01)
(52) U.S. Cl. .................... 455/3.06; 455/102
(58) Field of Classification Search ....... 455/3.01–3.06, 455/12.1, 102; 375/260, 267; 370/207
See application file for complete search history.

(56) References Cited

U.S. PATENT DOCUMENTS

| | | | |
|---|---|---|---|
| 5,315,584 A | 5/1994 | Savary et al. | ............... 370/312 |
| 5,646,935 A | 7/1997 | Ishilawa et al. | |
| 5,687,166 A | 11/1997 | Natali et al. | |
| 5,966,412 A | 10/1999 | Ramaswamy | |
| 5,987,068 A | 11/1999 | Cassia et al. | |
| 6,118,827 A | 9/2000 | Wynn | |

(Continued)

FOREIGN PATENT DOCUMENTS

EP          0594505          10/1993

(Continued)

OTHER PUBLICATIONS

Jacques Meyer, chief Architect, Consumer and Micro Group Set Top Box Division STMicroelectronics Inc., "High efficiency modulations for satellite TV", May 2003.

(Continued)

*Primary Examiner*—Raymond S Dean
(74) *Attorney, Agent, or Firm*—Jimmy L. Funke

(57) ABSTRACT

The present invention provides a method of hierarchically modulating first and second digital data streams in a broadcast system such as an SDAR system that is compatible with legacy receivers. The second digital data stream, but not the first, is provided with a non-binary pseudo-random encoding. A carrier is first modulated, e.g. QPSK, by the first digital data stream; and a second modulation is performed with the encoded second digital data stream. The encoding includes a multiplication of a matrix formed of 2, 3 or 4 consecutive bits of the secondary data stream by a matrix, e.g. a Hadamard matrix to form a product matrix having non-binary values that are used to modify consecutive symbols of the first modulation. The second modulation appears as Gaussian noise to legacy receivers over time.

17 Claims, 7 Drawing Sheets

U.S. PATENT DOCUMENTS

| | | | |
|---|---|---|---|
| 6,119,827 | A | 9/2000 | Militello et al. |
| 6,510,317 | B1 | 1/2003 | Marko et al. |
| 6,549,563 | B1 | 4/2003 | McDonough ............... 370/312 |
| 6,570,858 | B1 | 5/2003 | Emmons, Jr. et al. |
| 2005/0005120 | A1 | 1/2005 | Kahn et al. |
| 2005/0089068 | A1* | 4/2005 | Sun et al. .................... 370/509 |

FOREIGN PATENT DOCUMENTS

| | | |
|---|---|---|
| EP | 1011245 | 6/2000 |
| EP | 1065854 A2 | 1/2001 |
| WO | 0139456 | 5/2001 |
| WO | 0217615 | 2/2002 |
| WO | 2003024048 A2 | 3/2003 |
| WO | 2004/100479 | 11/2004 |

OTHER PUBLICATIONS

Schertz, Weck; Hierarchical modulation-the transmission of two independent DVB-T multiplexes on a single frequency; EBU Technical review; Apr. 2003, pp. 1-13.

DVB Digital Video Broadcasting; DVB, MHP, the DVB logo and the MHP logo are registered trademarks of the Digital Video Broadcasting Project, Mar. 1998.

Vitthaladevuni et al; "Exact BER Computation of Generalized Hierarchial PSK Constellations"; IEEE Feb. 2002, pp. 1974-1978.

J. Sesna; The DVB satellite, cable and SMATV systems; EBU Technical Review; Winter 1995; pp. 24-38.

Tanner; UBS Looks Southward, USB, a Canadian Developer of MMDS Equipment, Has Its Eyes on the U.S.; Aug. 2001; www.shorecliffcommunications.com, Broadband Wireless Online, pp. 1-6.

Yoshida; New DVB satellite modulation scheme drops Turbo; Mar. 7, 2003; EETIMESUK, www.electronicstimes.com; p. 1.

Pursley et al; "Adaptive Nonuniform Phase-Shift-Key Modulation for Multimedia Traffic in Wireless Networks"; IEEE Journal on Selected Areas in Communications, vol. 18, No. 8, Aug. 2000; pp. 1394-1407.

Vitthaladevuni et al; Effect of Imperfect Phase and Timing Synchronization on the Error Rate Performance of PSK Modulations; IEEE Mar. 2002; pp. 356-360.

Hossain et al; Hierarchial Modulations for Multimedia and Multicast Transmission over Fading Channels; IEEE Mar. 2003; pp. 2633-2637.

Pursley et al; "Nonuniform Phase-Shift-Key Modulation for Multimedia Multicast Transmission in Mobile Wireless Networks"; IEEE Journal on Selected Areas in Communications, vol. 17, No. 5, May 1999, pp. 774-783.

EP Search Report Dated Oct. 2, 2007.

* cited by examiner

METHOD TO MINIMIZE COMPATIBILITY ERROR IN HIERARCHICAL MODULATION USING VARIABLE PHASE

This application is a Continuation-in-Part of U.S. Utility patent application Ser. No. 10/974,279, filed Oct. 27, 2004 now abandoned and, through that application, claims the benefit of U.S. Provisional Patent Application No. 60/525,616 filed on Nov. 26, 2003.

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated twenty-five (25) megahertz (MHz) of the electromagnetic spectrum for satellite digital broadcasting, twelve and one-half (12.5) MHz of which are owned by XM Satellite Radio, Inc. of Washington, D.C. (XM), and 12.5 MHz of which are owned by Sirius Satellite Radio, Inc. of New York City, N.Y. (Sirius). Both companies provide subscription-based digital audio that is transmitted from communication satellites, and the services provided by these and other SDAR companies are capable of being transmitted to both mobile and fixed receivers on the ground.

In the XM satellite system, two (2) communication satellites are present in a geostationary orbit—one satellite is positioned at longitude 115 degrees (west) and the other at longitude eighty-five (85) degrees (east). Accordingly, the satellites are always positioned above the same spot on the earth. In the Sirius satellite system, however, three (3) communication satellites are present that all travel on the same orbital path, spaced approximately eight (8) hours from each other. Consequently, two (2) of the three (3) satellites are "visible" to receivers in the United States at all times. Since both satellite systems have difficulty providing data to mobile receivers in urban canyons and other high population density areas with limited line-of-sight satellite coverage, both systems utilize terrestrial repeaters as gap fillers to receive and re-broadcast the same data that is transmitted in the respective satellite systems.

In order to improve satellite coverage reliability and performance, SDAR systems currently use three (3) techniques that represent different kinds of redundancy known as diversity. The techniques include spatial diversity, time diversity and frequency diversity. Spatial diversity refers to the use of two (2) satellites transmitting near-identical data from two (2) widely-spaced locations. Time diversity is implemented by introducing a time delay between otherwise identical data, and frequency diversity includes the transmission of data in different frequency bands. SDAR systems may utilize one (1), two (2) or all of the techniques.

The limited allocation of twenty-five (25) megahertz (MHz) of the electromagnetic spectrum for satellite digital broadcasting has created a need in the art for an apparatus and method for increasing the amount of data that may be transmitted from the communication satellites to the receivers in SDAR systems.

SUMMARY OF THE INVENTION

The present invention provides an apparatus and method for increasing the amount of digital data that may be transmitted from communication satellites to receivers in SDAR systems. In doing so, the present invention provides an advantage over the prior art. While hierarchical modulation schemes have been previously used in other data transmission applications (e.g., Digital Video-Broadcasting-Terrestrial [DVB-T] and DVB-Satellite [DVB-S] systems), until now, such hierarchical modulation schemes have not been envisioned for use in SDAR systems. By introducing the use of hierarchical modulation in SDAR systems, the present invention increases the amount of data that may be transmitted in SDAR systems and enables the enhanced performance of the receivers that receive the satellite-transmitted signals in SDAR systems.

In one form of the present invention, a method for transmitting two levels of data in a hierarchical transmission system achieves these ends. The method includes generating a first modulated signal based on first input data. One or more additional modulations are superimposed on the first modulated signal based on additional input data, each additional input data being spread across a plurality of symbols in the first modulated signal as a predetermined pattern to generate a modified signal which is transmitted. The modified signal is decoded by performing a first demodulation of the first modulated signal to obtain the first input data and then additional demodulations to obtain the additional input data.

In another form of the present invention, a receiver is provided for receiving two levels of data in a hierarchical transmission system. The receiver has an antenna for receiving RF signals with a demodulator coupled to the antenna for downconverting received RF signals. A first detector is coupled to the demodulator and has a first output and capable of providing digital information based on a first level of data on the first output. Additional detectors are coupled to the demodulator and have additional outputs, which are capable of providing digital information based on an additional level of data on the additional outputs. The additional detectors are adapted to detect said additional levels of data as predetermined patterns spread over the first level of data.

In still another form, the present invention provides a transmitter for transmitting two levels of data in a hierarchical transmission system. The transmitter has an encoder adapted to receive a first and second input data. The encoder is capable of providing digital information based on a first level of data on an output stream with a second level of data being superimposed as predetermined patterns spread over the first level of data. A modulator is coupled to the encoder for upconverting said output stream, with an antenna coupled to the modulator for transmitting RF signals based on the upconverted output stream.

In other forms of the present invention, a plurality of offset sequence values spread the second modulation across the first modulated signal. The offset sequence may be a pseudo-random distribution of offset sequence values, and may include at least one zero offset value. Alternatively, the second modulated signal may be a combination of direct sequence spread spectrum modulations or combinations of a Hadamard matrix sequence.

BRIEF DESCRIPTION OF THE DRAWING

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
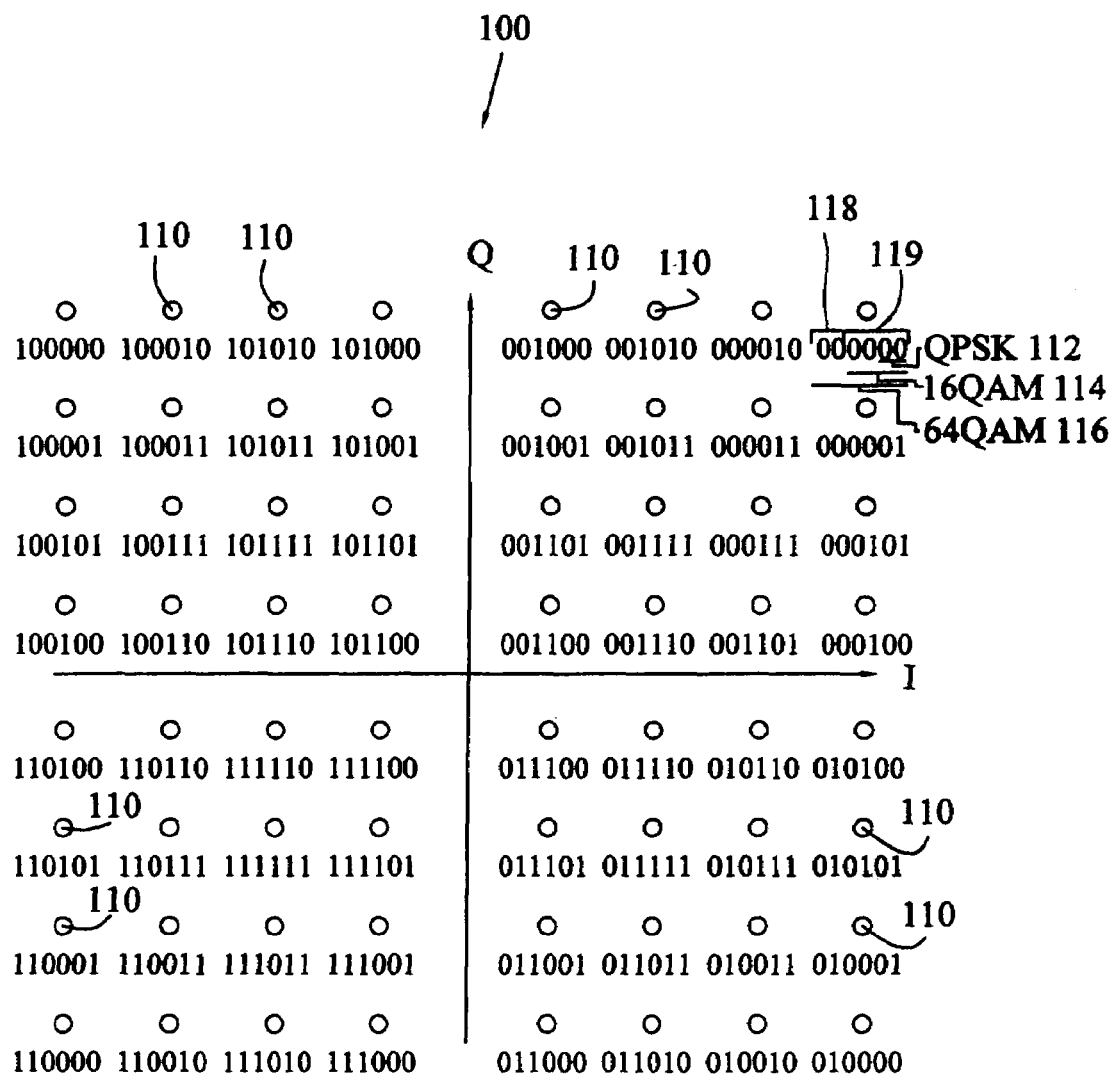
FIG. 1 is an illustrative view of a constellation chart for 64-quadrature amplitude modulation (QAM) with an embedded quadrature phase shift keying (QPSK) stream.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted in accordance with the following definitions.

Baseband: A signal whose frequency content is in the vicinity of direct current (DC).

Carrier: A single frequency electromagnetic wave the modulations of which are used as communications signals.

Channel: A propagation medium for communication such as a path along which information in the form of an electrical signal passes (e.g., wire, air, water).

Data rate: The amount of data, or number of symbols, which may be transmitted on a signal per a unit of time.

Detector: A circuit that is capable of determining the content of a signal.

Downconvert: To convert a radio frequency signal from a higher to a lower frequency signal for processing (i.e., to baseband).

Downlink: To transmit data from a satellite to a receiver on earth.

Feed Forward Correction (FFC): A method of improving secondary data detection. By knowing the relative "I" (in-phase) and "Q" (quadrature) components of a constellation quadrant, the secondary detector may be enhanced to perform better by having a priori knowledge from the first detector to assist detection.

First Level Data and/or Primary Data: Existing data that may be interpreted by current (i.e., "legacy") SDAR receivers. Because the first level data can be interpreted by the legacy receivers, the first level data may also be considered to have backwards compatibility.

Hierarchical Modulation: A method in which two separate data or bit streams are modulated onto a single data stream by superimposing an additional data stream upon, mapped on, or embedded within the primary data transmission. The additional data stream may have a different data rate than the primary data stream. As such, the primary data is more susceptible to noise than it would be in a non-hierarchical modulation scheme. The usable data of the additional stream may be transmitted with a different level of error protection than the primary data stream. Broadcasters of SDAR services may use the additional and primary data streams to target different types of receivers, as will be explained below.

Legacy receiver: A current or existing SDAR receiver that is capable of interpreting first level data. Legacy receivers typically interpret second level data as noise.

Preamble: A known symbol or symbols in a transmission packet (typically used for synchronization).

Quadrature: A method of coding information that groups data bits and transmits two separate signals on a carrier by summing the cosine and sine of the separate signals to produce a composite signal which may be later demodulated to recover both signals.

Second Generation Receiver: A SDAR receiver that contains hardware and/or software enabling the receiver to interpret second level data (e.g., demodulator enhancements). Second generation receivers may also interpret first level data.

Second Level Data, Secondary Data and/or Hierarchical Data: The additional data that is superimposed on the first level data to create a hierarchically modulated data stream. Second level data may be interpreted by SDAR receivers containing the appropriate hardware and/or software to enable such interpretation (i.e., "second generation" receivers). Second level, or secondary, data may perform differently from first level, or primary, data.

Signal: A detectable physical quantity or impulse by which information can be transmitted.

Symbol: A unit of data (byte, floating point number, spoken word, etc.) that is treated independently.

Unitary Signal: A signal on a single channel or path.

Upconvert: To convert from a lower frequency signal (i.e., baseband) to a higher radio frequency signal for broadcasting.

Uplink: A communications channel or facility on earth for transmission to a satellite, or the communications themselves.

Upmix: To combine multiple electrical signals to a radio frequency signal for broadcasting.

Waveform: A representation of the shape of a wave that indicates its characteristics (frequency and amplitude).

QAM is one form of multilevel amplitude and phase modulation that is often employed in digital data communication systems. Using a two-dimensional symbol modulation composed of a quadrature (orthogonal) combination of two (2) pulse amplitude modulated signals, a QAM system modulates a source signal into an output waveform with varying amplitude and phase. Data to be transmitted is mapped to a two-dimensional, four-quadrant signal space, or constellation. The QAM constellation employs "I" and "Q" components to signify the in-phase and quadrature components, respectively. The constellation also has a plurality of phasor points, each of which represent a possible data transmission level. Each phasor point is commonly called a "symbol," represents both I and Q components and defines a unique binary code. An increase in the number of phasor points within the QAM constellation permits a QAM signal to carry more information.

Many existing systems utilize QPSK modulation systems. In such QPSK systems, a synchronous data stream is modulated onto a carrier frequency before transmission over the satellite channel, and the carrier can have four (4) phase states, e.g., 45 degrees, 135 degrees, 225 degrees or 315 degrees. Thus, similar to QAM, QPSK employs quadrature modulation where the phasor points can be uniquely described using the I and Q axes. In contrast to QAM, however, the pair of coordinate axes in QPSK can be associated with a pair of quadrature carriers with a constant amplitude, thereby creating a four (4) level constellation, i.e., four (4) phasor points having a phase rotation of 90 degrees. Differential quadrature phase shift keying (D-QPSK) refers to the procedure of generating the transmitted QPSK symbol by calculating the phase difference of the current and the preceding QPSK symbol. Therefore, a non-coherent detector can be used for D-QPSK because it does not require a reference in phase with the received carrier.

Hierarchical modulation, used in DVB-T systems as an alternative to conventional QPSK, 16-QAM and 64-QAM modulation methods, may better be explained with reference to FIG. 1. FIG. 1 illustrates 64-QAM constellation 100. Each permissible digital state is represented by phasors 110 in the I/Q plane. Since eight (8) by eight (8) different states are defined, sixty-four (64) possible values of six (6) bits may be transmitted in 64-QAM constellation 100. FIG. 1 shows the assignment of binary data values to the permissible states. In a 16-QAM constellation, there are four (4) by four (4) different states and four (4) transmitted bits, in a 4-PSK constellation, there are two (2) by two (2) states and two (2) transmitted bits, and in a BPSK constellation, there is one (1) state and one (1) transmitted bit.

In systems employing hierarchical modulation schemes, the possible states are interpreted differently than in systems using conventional modulation techniques (e.g., QPSK, 16-QAM and 64-QAM). By treating the location of a state within its quadrant and the number of the quadrant in which the state is located as a priori information, two separate data streams may be transmitted over a single transmission channel. While 64-QAM constellation 100 is still being utilized to map the data to be transmitted, it may be interpreted as the combination of a 16-QAM and a 4-PSK modulation. FIG. 1 shows how 64-QAM constellation 100, upon which is mapped data transmitted at six (6) bits/symbol 116, may be interpreted as including QPSK constellation 112 (which includes mapped data transmitted at two (2) bits/symbol) combined with 16-QAM constellation 114 (which includes mapped data transmitted at four (4) bits/symbol). The combined bit rates of QPSK and the 16-QAM data steams is equal to the bit rate of the 64-QAM data stream.

In systems employing hierarchical modulation schemes, one (1) data stream is used as a secondary data stream while the other is used as a primary data stream. The secondary data stream typically has a lower data rate than the primary stream. Again referring to FIG. 1, using this hierarchical modulation scheme, the two (2) most significant bits 118 may be used to transmit the secondary data to second generation receivers while the remaining four (4) bits 119 may be used to code the primary data for transmission to the legacy receivers.

Figure 2:
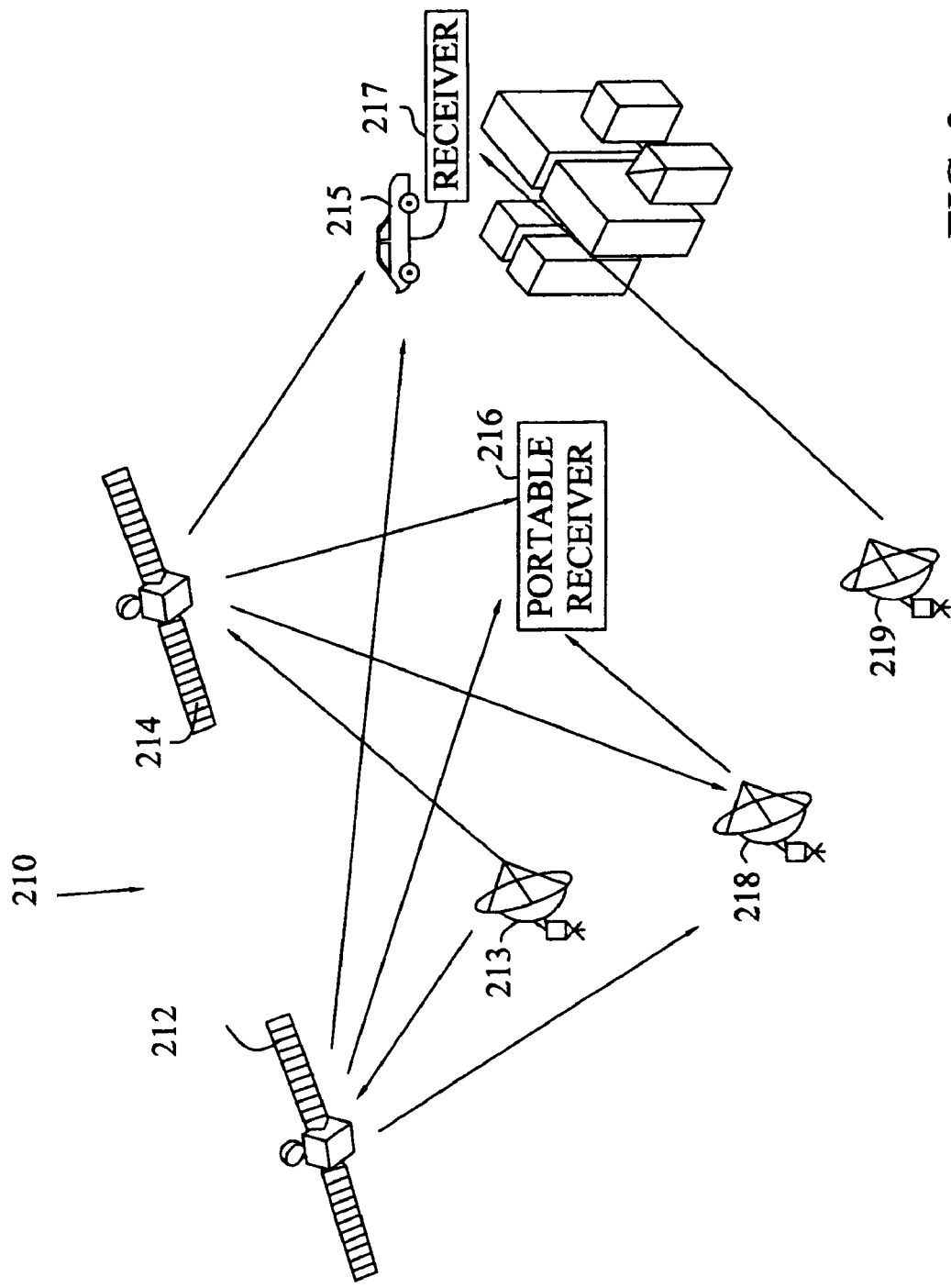
FIG. 2 is a diagrammatic view of a SDAR system implementing a method of the present invention.

The present invention contemplates the use of hierarchical modulation in a SDAR system, while maintaining backward compatibility for legacy receivers. Shown in FIG. 2 is a diagrammatic view of a SDAR system in which a hierarchical modulation scheme is employed. SDAR system 210 includes first and second communication satellites 212, 214, which transmit line-of-sight signals to SDAR receivers 216, 217 located on the earth's surface. A third satellite may be included in other SDAR systems. Satellites 212, 214, as indicated above, may provide for spatial, frequency and time diversity. As shown, receiver 216 is a portable receiver such as a handheld radio or wireless device. Receiver 217 is a mobile receiver for use in vehicle 215. SDAR receivers 216, 217 may also be stationary receivers for use in a home, office or other non-mobile environment.

SDAR system 210 further includes a plurality of terrestrial repeaters 218, 219. Terrestrial repeaters 218, 219 receive and retransmit the satellite signals to facilitate reliable reception in geographic areas where the satellite signals are obscured from the view of receivers 216, 217 by obstructions such as buildings, mountains, canyons, hills, tunnels, etc. The signals transmitted by satellites 212, 214 and terrestrial repeaters 218, 219 are received by receivers 216, 217, which either combine or select one of the signals as receiver's 216, 217 output.

Figure 3:
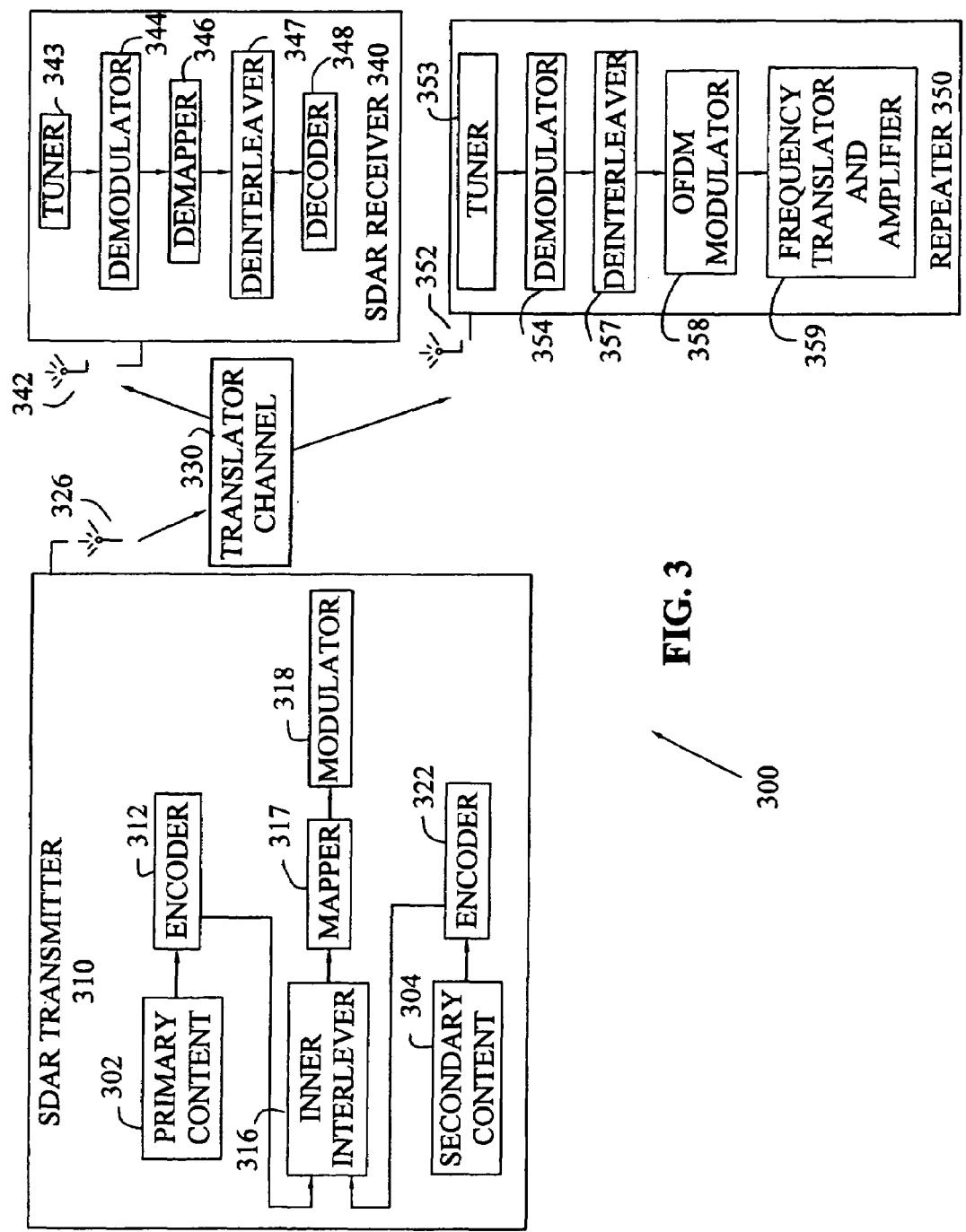
FIG. 3 is a block diagram of a SDAR communication system adapted to enable a method of the present invention.

FIG. 3 illustrates a block diagram of a SDAR communication system in which hierarchical modulation is utilized. In an exemplary embodiment of the present invention, SDAR communication system 300 includes SDAR transmitter 310, SDAR receiver 340 and terrestrial repeater 350. As in conventional SDAR communication systems, SDAR communication system 300 will input data content 302, 304 and perform processing and frequency translation within transmitter 310. The digital data is transmitted over transmission channel 330 to receiver 340 or terrestrial repeater 350. Generally, receiver 340 performs the converse operations of transmitter 310 to recover data 302, 304. Repeater 350 generally retransmits data 302, 304 to receiver 340. Unlike conventional SDAR communication systems, however, transmitter 310, receiver 340 and repeater 350 of the present invention provide hardware enabling SDAR communication system 300 to utilize a hierarchical modulation scheme to transmit and receive more digital data than conventional systems.

SDAR transmitter 310 includes encoders 312, 322. The audio, video, or other form of digital content to be transmitted comprises primary input signal 302 and secondary input signal 304, which are typically arranged as series of k-bit symbols. Primary input signal 302 contains primary, or first level, data and secondary input signal 304 contains secondary, or second level, data. Encoders 312, 322 encode the k bits of each symbol as well as blocks of the k-bit symbols. In other embodiments of the present invention, separate encoders may be used to encode the blocks of k-bit symbols, for example, outer and inner encoders. In an exemplary embodiment of the present invention, encoder 312 may encode primary data stream 302 using a block or a convolutional forward error correction (FEC) algorithm, and encoder 322 may encode secondary data stream 304 using a turbo coding algorithm or a low density parity check FEC algorithm. It is contemplated that other FEC encoding methods may be utilized to encode primary and secondary data streams 302, 204, including, for example, Hamming codes, cyclic codes and Reed-Solomon (RS) codes.

Figure 6:
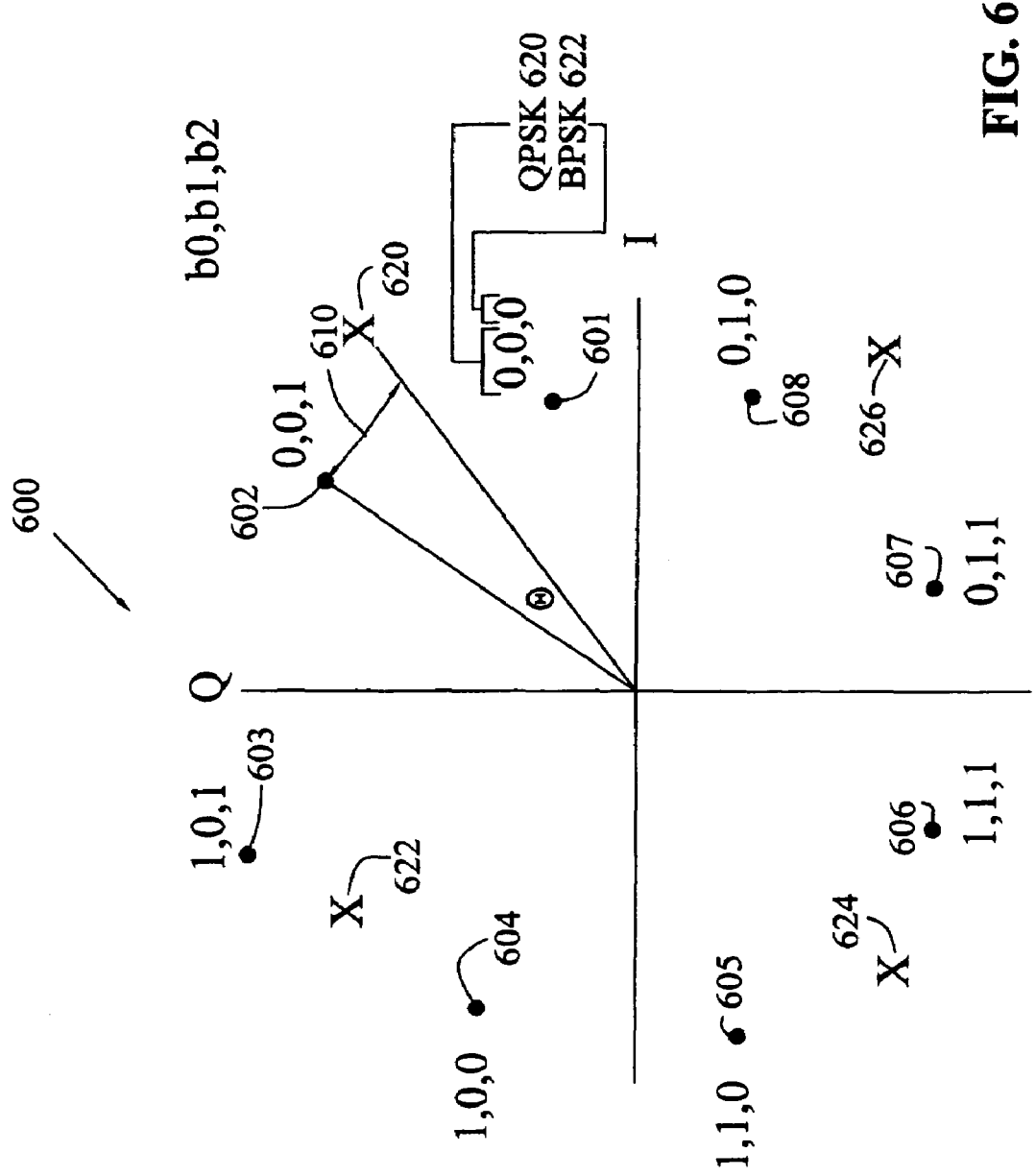
FIG. 6 is a diagrammatic view of a hierarchical 8-PSK constellation.

Again referring to FIG. 3, inner interleaver 316 multiplexes encoded secondary content data stream 304 with encoded primary content data stream 302 to form a transmit data stream. This transmit data stream is passed to mapper 317, which maps the data stream into symbols composed of I and Q signals. Mapper 317 may be implemented as a look-up table where sets of bits from the transmit signal are translated into I and Q components representing constellation points or symbols. FIG. 6 is representative of an exemplary embodiment of the present invention, in which a hierarchical modulation scheme is employed and the constellation points are in accordance with either a uniform or non-uniform 8-PSK constellation 600, where each phasor is represented by a three (3) bit symbol composed of I and Q signals.

Figure 4:
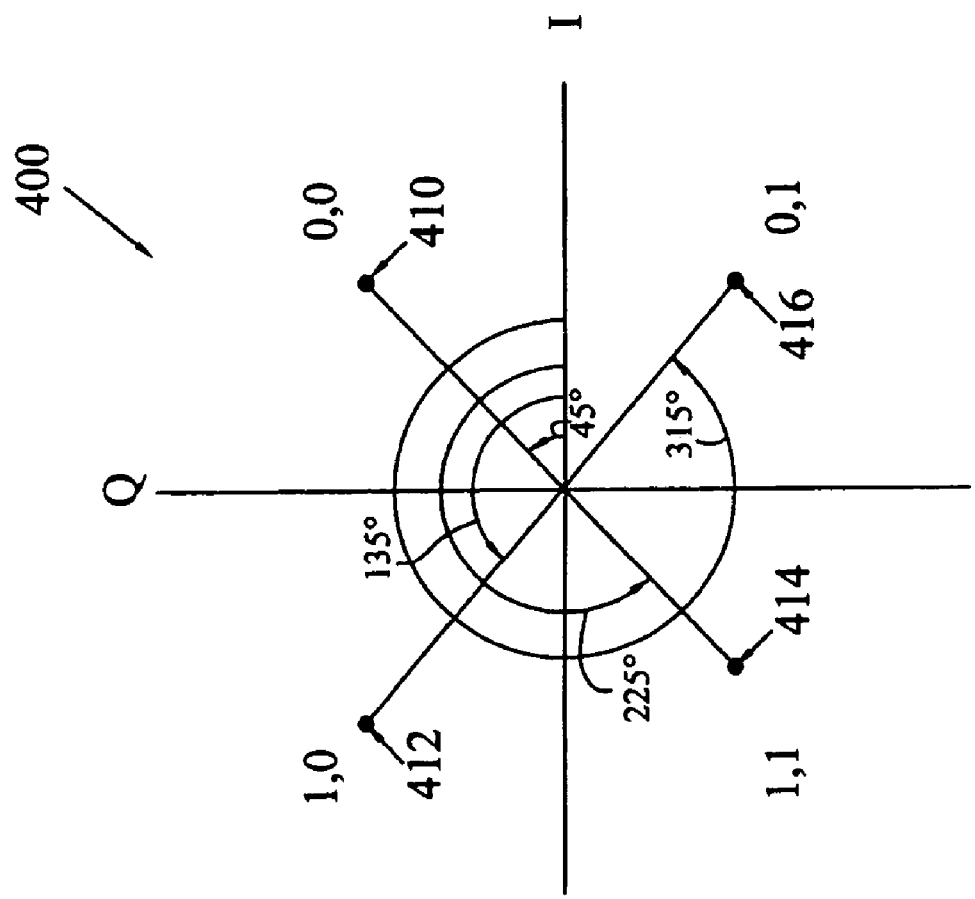
FIG. 4 is a diagrammatic view of a QPSK constellation.
Figure 5:
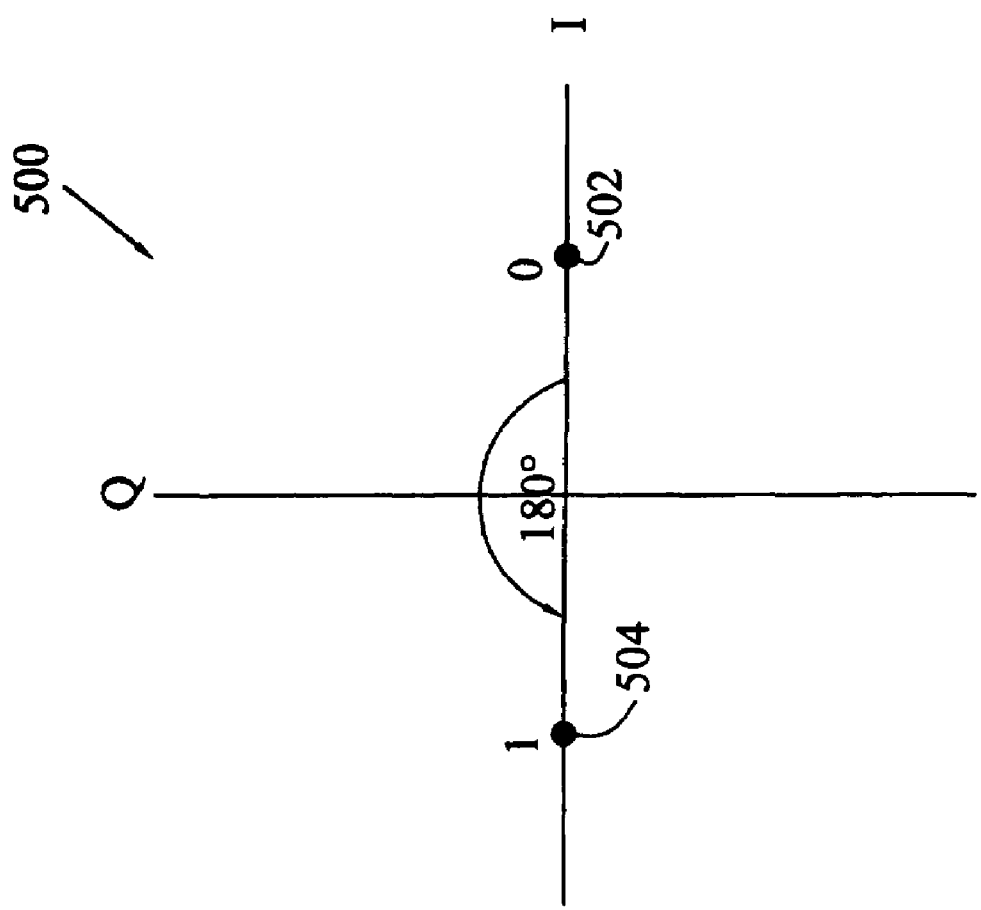
FIG. 5 is a diagrammatic view of a binary phase shift keying (BPSK) constellation.

FIG. 4 shows QPSK constellation 400 for primary data having two (2) transmitted bits/symbol. Phasors "00", "10", "11", "01" correlate to a phase of 45 degrees, a phase of 135 degrees, a phase of 225 degrees and a phase of 315 degrees, respectively. FIG. 5 shows BPSK constellation 500 for secondary data having one (1) transmitted bit/symbol. Phasors "0" and "1" correlate to a phase of zero (0) and 180 degrees, respectively. When a secondary data symbol is added onto a primary data symbol, constellation 600 of FIG. 6 is illustrative of the resulting hierarchical modulation.

Constellation 600 may be perceived as two (2) sets of superimposed modulations—QPSK constellation 400 transmitting two (2) bits/symbol 620 combined with BPSK constellation 500 comprising one (1) bit/symbol. The first modulation is the primary QPSK data, which is represented by "x" marks 620, 622, 624, 626. In order to superimpose the secondary data onto the primary data, the primary QPSK data is phase offset by the additional, secondary data, which is represented by any of data points 601, 602, 603, 604, 605, 606, 607, 608 depending on the phase offset. Positive phase offsets include phasors 602, 604, 606 and 608, and negative phase offsets include 601, 603, 605 and 607.

Shown in FIG. 6, phase offset 610 is the offset angle relative to the QPSK symbol. As explained above, a typical QPSK constellation contains 45 degree, 135 degree, 225 degree and 315 degree points. The hierarchical data is represented by a phase offset relative to those four (4) degree points, and the phase offsets with the four (4) degree points represent a hierarchical (8-PSK) constellation. A uniform 8-PSK constellation is created when offset angle 610 is 22.5 degrees. Every other offset angle 610 creates a non-uniform 8-PSK constellation. For example, as shown in FIG. 6, a 15 degree phase offset relative to primary data phasors 620, 622, 624, 626 produces a phase offset correlative to phasors 601 ("000") or 602 ("001"), 603 ("101") or 604 ("100"), 605 ("110") or 606 ("111"), and 607 ("011") or 608 ("010"), respectively. Gray coding is a method which may be used to make the bit assignments for the hierarchical constellation. For example, reference is made to the secondary data bit (b2). Instead of making b2=0 a negative offset and b2=1 a positive outset, the hierarchical constellation may be configured so as to increase the bit error rate (BER) performance (e.g., b2=1 can be made a negative offset).

The amount of the phase offset is equal to the amount of power in the secondary signal. The amount of energy in the secondary signal may not be equal to the amount of energy in the primary signal. As phase offset 610 is increased, the energy in the secondary data signal is also increased. The performance degradation to the primary data signal is minimized by the perceived coding gain improvement as phase offset 610 is increased. The application of the hierarchical phase modulation on top of an existing QPSK signal containing primary data causes phase offset 610 to adjust either positively or negatively relative to the hierarchical data.

In general, a secondary data bit causes either a larger Q magnitude and smaller I magnitude or a larger I magnitude and smaller Q magnitude. With FEC techniques utilized in encoders 312, 322, the I and Q signals are used in conjunction with each other over a block of data. These techniques give the appearance that the primary data bits are spread over time, enabling the secondary data to appear somewhat orthogonal to the primary data bits. Indeed, it has been shown in simulations that the secondary data's impact on the primary data is somewhat orthogonal. For example, for a twenty (20) degree phase offset for secondary data, the primary data has a one (1) decibel (dB) degradation when using a rate 1/3 convolutional code with a constraint length of seven (7), followed by a (255, 223) RS block code (8 bits/symbol). However, when the primary data has no FEC coding, the impact of the twenty (20) degree phase offset is 4.1 dB. This data demonstrates a perceived coding improvement of 3.1 dB in the case where phase offset 610 is set to twenty (20) degrees.

Again referring to FIG. 3, the FEC coding technique implemented by encoders 312, 322 spreads the primary and secondary data over many QPSK symbols, which essentially spreads the energy over time and the I and Q bits. To overcome the unequal signal-to-noise ratio ("Eb/No") between primary data bits and secondary data bits, the amount of phase offset 610 may be increased until the performance of the primary data is equal to the performance of the secondary data. However, as phase offset 610 is increased, legacy receivers may have a difficult time acquiring and tracking the desired primary data signal. By spreading the second level bits over multiple symbols, spread spectrum coding techniques may be used to increase the amount of energy in the secondary bits. This allows phase offset 610 to be adjusted and made more compatible with legacy receivers. Additionally, the use of second level data spreading reduces overall second level data throughput. Overall, several techniques may be utilized to maximize the performance of the secondary data. These techniques include: increasing phase offset 610 to maximize the secondary data energy per symbol; using multiple symbols per secondary data bit; using more complex FEC algorithms, and using a beam steering antenna to improve the performance of the secondary data (e.g., a higher gain directional antenna for stationary reception and a pointing/steering antenna for mobile reception).

Referring back to FIG. 3, after mapper 317 translates encoded and interleaved primary and secondary data streams 302, 304, respectively, into I and Q components, the I and Q components are modulated by modulator 318. Modulation enables both primary data stream 302 and secondary data stream 304 to be transmitted as a single transmission signal via antenna 326 over single transmission channel 330. Primary data stream 302 is modulated with secondary data stream 304 using one of a number of modulation techniques, including amplitude or phase and may include differential or coherent modulation (for example, BPSK, QPSK, differential Q-PSK (D-QPSK) or pi/4 differential QPSK (pi/4 D-QPSK)). According to the technique that modulator 318 employs, modulator 318 may be any of amplitude or phase modulator. Each modulation technique is a different way of transmitting the data across channel 330. The data bits are grouped into pairs, and each pair is represented by a symbol, which is then transmitted across channel 330 after the carrier is modulated.

An increase in the capacity of the transmitted signal would not cause backwards compatibility problems with legacy receivers as long as the legacy receivers may interpret the first level data. Second generation receivers, however, are capable of interpreting both first and second level data. Techniques may be employed to minimize the degradation in the legacy receiver, including decreasing phase offset 610 to limit the amount of the second level data energy per symbol, limiting the amount of time over which the second level data is transmitted, and making the second level data energy appear as phase noise to the legacy receiver.

Referring back to FIG. 2, after modulator 318 modulates first data stream 302 and second level data stream 304 (FIG. 3) to create a transmission signal, transmitter 213 uplinks the transmission signal to communication satellites 212, 214. Satellites 212, 214, having a "bent pipe" design, receive the transmitted hierarchically modulated signal, performs frequency translation on the signal, and re-transmits, or broadcasts, the signal to either one or more of plurality of terrestrial repeaters 218, 219, receivers 216, 217, or both.

As shown in FIG. 3, terrestrial repeater 350 includes terrestrial receiving antenna 352, tuner 353, demodulator 354, de-interleaver 357, modulator 358 and frequency translator and amplifier 359. Demodulator 354 is capable of down-converting the hierarchically modulated downlinked signal to a time-division multiplexed bit stream, and de-interleaver 357 re-encodes the bit-stream in an orthogonal frequency division multiplexing (OFDM) format for terrestrial transmission. OFDM modulation divides the bit stream between a large number of adjacent subcarriers, each of which is modulated with a portion of the bit stream using one of the M-PSK, differential M-PSK (D-MPSK) or differential pi/4 M-PSK (pi/4 D-MPSK) modulation techniques. Accordingly, if a hierarchically modulated signal is transmitted to one or both terrestrial repeaters 218, 219 (FIG. 2), terrestrial repeaters 218, 219 receive the signal, decode the signal, re-encode the signal using OFDM modulation and transmit the signal to one or more receivers 216, 217. Because the signal contains both the first and second level data, the terrestrial signal maintains second level data bit spreading over multiple symbols.

Also shown in FIG. 3, SDAR receiver 340 contains hardware (e.g., a chipset) and/or software to process any received hierarchically modulated signals as well. Receiver 340 includes one or more antennas 342 for receiving signals transmitted from either communication satellites 212, 214, terrestrial repeaters 218, 219, or both (FIG. 2). Receiver 340 also includes tuner 343 to translate the received signals to baseband. Separate tuners may be used to downmix the signals received from communication satellites 212, 214 and the signals received from terrestrial repeaters 218, 219. It is also envisioned that one tuner may be used to downmix both the signals transmitted from communication satellites 212, 214 and the signals transmitted from repeaters 218, 219.

Once the received signal is translated to baseband, the signal is demodulated by demodulator 344 to produce the I and Q components. De-mapper 346 translates the I and Q components into encoded primary and secondary data streams. These encoded bit streams, which were interleaved by interleaver 316, are recovered by de-interleaver 347 and passed to decoder 348. Decoder 348 employs known bit and block decoding methods to decode the primary and secondary bit streams to produce the original input signals containing the primary and secondary data 302, 304. In other embodiments of the present invention, multiple decoders may be used, e.g., outer and inner decoders. Receiver 340 may also use a feed forward correction technique to improve its detection of the secondary data. By knowing the relative I/Q quadrant, receiver 340 may be enhanced to perform better by having such a priori knowledge, which assists in the detection of the transmitted signal. For example, referring to FIG. 6, if it is known from a priori first level data knowledge that symbol 602 or 601 was transmitted at some point in time, and the received symbol lands at 604, it can be inferred by minimum distance that the received second level data bit is a weak one (1) by utilizing feed forward correction. However, without feed forward correction the second level data bit would have been detected as a strong zero (0). Therefore, feed forward detection utilizes the decoded symbol with the detected offset (either positive or negative) to determine the secondary data bit.

Figure 7:
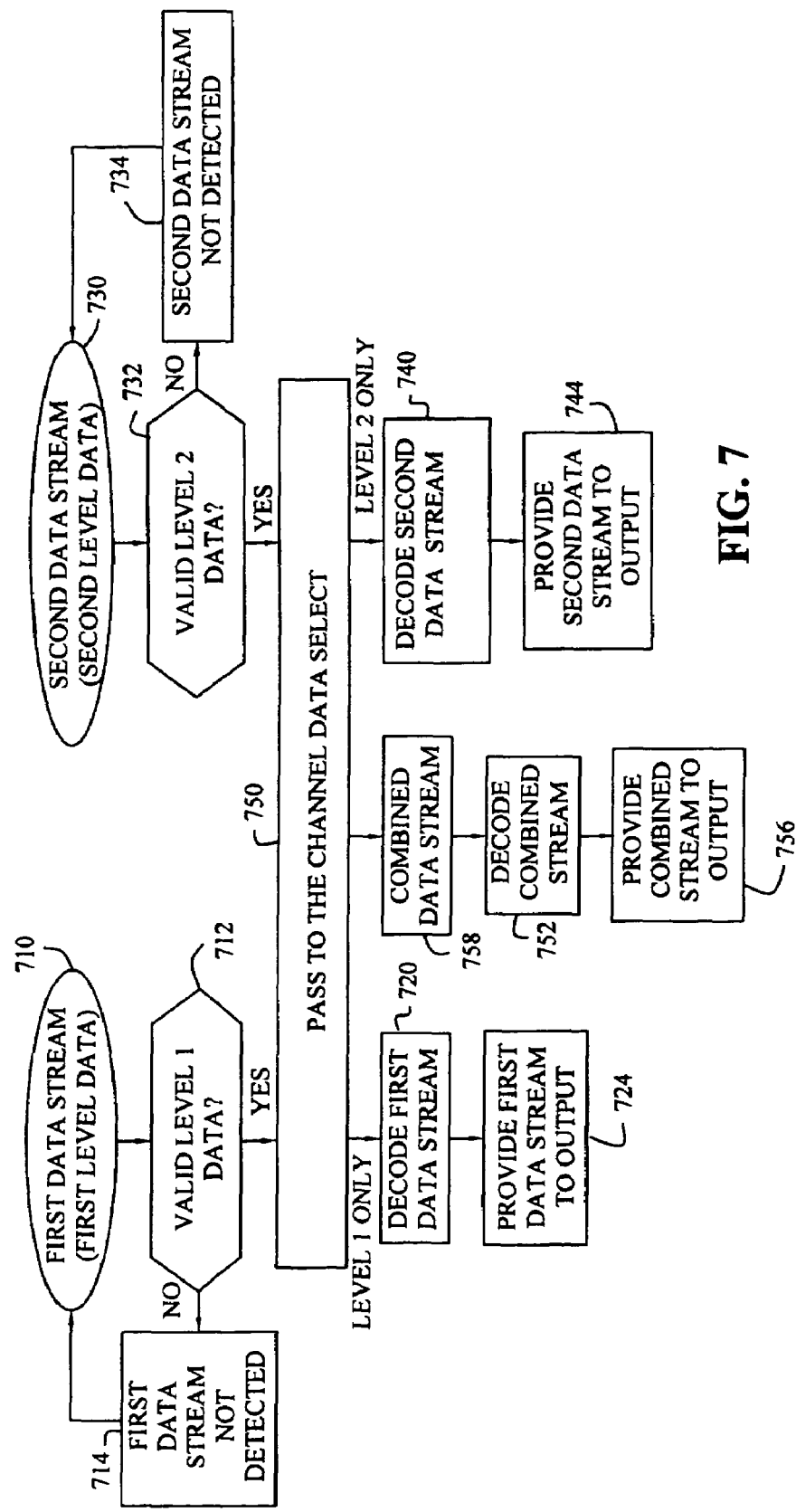
FIG. 7 is a flow chart illustrating a method of the present invention as utilized in a SDAR receiver.

In another embodiment of the present invention, a method of enabling extra data bits from a hierarchical modulation scheme to be used to transmit additional data for each channel in a SDAR system is contemplated. A flow chart illustrating this embodiment of the present invention as utilized in an SDAR communication system is shown in FIG. 7. It is contemplated that the inventive method would be carried out by a receiver adapted to be used in a SDAR system. The receiver may concurrently process the receipt of first data stream 710 and second data stream 730. If first data stream 710 is valid as determined by error checking at step 712, first data stream 710 is passed to a channel data select at step 750. If first data stream 710 is selected and second data stream 730 is either independent or not valid, only first data stream 710 is decoded at step 720 at its original rate, e.g., forty-eight (48) kbps. The decoded data from first data stream 710 is then passed to an output unit at step 724.

If second data stream 730 is valid as determined by error checking at step 732, then second data stream 730 is passed to the channel data select at step 750. If second data stream 730 is selected and is independent from first data stream 710, only second data stream 730 is decoded at step 740 at its original rate, e.g., sixteen (16) kbps. The decoded data from second data stream 730 is then passed to an output unit at step 744.

If the receiver determines at step 712 that first data stream 710 is valid and at step 732 that second data stream 730 is valid, both data streams are passed to the channel data select at step 750. The channel data select determines if second data stream 730 is an enhancement to first data stream 710. Audio enhancements may include audio quality enhancements, audio coding enhancements such as 5.1 audio (i.e., a Dolby® AC-3 digital audio coding technology in which 5.1 audio channels [left, center, right, left surround, right surround and a limited-bandwidth subwoofer channel] are encoded on a bit-rate reduced data stream), data/text additions, album pictures, etc. If second data stream 730 is an enhancement to first data stream 710, the channel data select combines the two (2) data streams such that the combined signal has a data rate greater than the first data stream's 710 data rate, e.g., 64 kbps. Thus, the sixteen (16) kbps data rate of second data stream 730 acts to increase the rate of first data stream 710 from forty-eight (48) kbps to sixty-four (64) kbps. Combined data stream 758 is then decoded at step 752 and passed to an output unit at step 756. In an exemplary embodiment, when switching from first data stream 710 to combined data stream 758, the increase in data rate is blended so as not to enable a quick change between first data stream 710 and combined data stream 758. If second data stream 730 is determined to be invalid, the channel data select switches to a "first data level" only implementation and sends first data stream 710 to be decoded at step 720. The data rate of first data stream 710 remains at its original forty-eight (48) kbps. In an exemplary embodiment of this inventive method, a decrease in data rate is blended so as not to enable a quick change between first data stream 710 and combined data stream 758. Assuming that second data stream 730 becomes or remains valid, the receiver decodes combined data stream 758 at step 752 and provides combined data stream 758 to an output unit at step 756.

A further enhancement to the present invention involves superimposing the secondary data by spreading it over a predetermined pattern and thus does not pose as many problems for legacy receivers. Hierarchical modulation data streams which have secondary data superimposed in predictable patterns may be compensated for in the error correction procedures, e.g. FFC, of legacy receivers. This may cause a legacy receiver to incorrectly adjust detection of the primary data and result in a incorrect decoding of the primary data. By using a less predictable but known pattern, a predetermined pattern or sequence, the hierarchical modulation scheme may optimize the secondary data transfer rate while minimally effecting the performance of legacy receivers. For example, using a pseudo-random distribution of strong secondary data signals (i.e., a large phase offset) spread over the primary data, a second generation receiver may optimize its performance with an a priori knowledge of the secondary data distribution. Alternatively, where multiple secondary data streams are present, a direct sequence spread spectrum (DSSS) approach may be used to have a fixed offset superimposed on each DSSS sequence (a Hadamard matrix is an effective DSSS implementation). With either approach, the pattern is predetermined in the sense that either the pattern itself or the method by which the pattern may be calculated is known.

As an example of an a priori system, an a prior pattern or sequence of phase shifts may comprise ±(5°, 5°, 5°, 5°, 10°, 10°, 10°, 15°, 15°, 20°, 15°, 15°, 10°, 10°, 10°, 5°, 5°, 5°, , and 5°). This offset sequence may be represented by 1, 1, 1, 1, 2, 2, 2, 3, 3, 4, 3, 3, 2, 2, 2, 1, 1, 1, and 1 where the sequence is implemented by multiplying by ±5. Thus, each primary symbol has a variable amount of secondary data, to which a second generation receiver may have software with this predetermined sequence in its memory so that the secondary data may be detected and properly decoded. However, a bell shaped pattern with little randomness such as this example may pose problems for legacy receivers, where the legacy receiver carrier and timing recovery algorithms are affected by this predictable pattern such that it has causes additional carrier and timing errors. Such errors may result in the primary data being decoded incorrectly. It is desirable to have the sequence appear random to the legacy receiver.

An example which mitigates the effects on legacy receivers may have a more pseudo-random distribution, for example this second offset sequence: 2, 1, 2, 2, 1, 3, 1, 3, 1, 4, 1, 3, 1, 3, 1, 2, 2, 1, and 2. While this second offset sequence has the same number and amounts of offsets, the pseudo-random distribution potentially mitigates the amount of carrier and timing recovery errors that a legacy receiver is likely to use. Thus, the second generation receiver perceives both offset sequences as a priori superimpositions on the primary data and has software for correctly detecting both the primary and the secondary data. However, a legacy receiver is less likely to make unwarranted carrier and timing adjustments on the pseudo-random second offset sequence compared to the first offset sequence example. In fact, legacy receiver performance may be further enhanced by using zero offsets for some of the sequence values.

Another example of a pseudo-random sequence involves a transmission using DSSS techniques. In this example, multiple spread spectrum secondary data is simultaneously superimposed across multiple primary data symbols where the combination of spread spectrum signals at any given primary data symbol creates a random offset. In this example, each spread spectrum signal is a binary sequence of fixed offsets that when used for each secondary data creates a unique pseudo-random offset sequence. The unique pseudo-random sequence is the sequence of the Pseudo-Noise (PN) generator used in the DSSS modulation technique. The secondary data is superimposed on the primary data symbol being transmitted and is spread over the PN sequence. With this example, the secondary data can have the same amount of energy per symbol, and is thus less susceptible to transmission errors. One type of sequence that provides advantages is a Hadamard matrix sequence in the DSSS technique, which provides performance enhancements, as each element of the sequence is orthogonal to the other elements thus making detection and computation of the secondary data relatively easy from a computational perspective.

In an embodiment of applicants' invention, the transmitter hierarchically modulates a first digital data stream as a base QPSK modulation having successive symbols with four defined nominal values (constellation points representing phase angles) that are expected in legacy QPSK receivers (see points 410, 412, 414, 416 in FIG. 4 or points 620, 622, 624, 626 in FIG. 6). The transmitter modifies each symbol of the QSPK modulated signal in a second modulation by providing offsets from the nominal values to create transmission values in the transmitted signal, as shown by points 601-608 in FIG. 6. The offsets are determined by the additional digital data stream(s) which are provided with a pseudo-random encoding and result in actual constellation values in the same quadrant as the corresponding nominal values. A receiver designed with prior knowledge of the entire hierarchical modulation and coding methods expects the transmission values in the received signal and has no difficulty receiving, demodulating and decoding all the included digital data streams. A legacy receiver expecting the nominal values only and attempting to demodulate the same signal as a QPSK modulated signal can determine the quadrant of each successive transmission value in the demodulation and decode the first digital data stream, for two reasons: (1) the first digital data stream is not provided with the pseudo-random encoding that is provided to the other data stream(s) and is thus recognizable and understandable, and (2) the pseudo-random encoded other data stream(s) appear as pseudo-random noise, which has characteristics reducing its ability to fool the synchronization circuits of the receiver into erroneously changing the phase synchronization between the receiver and the received signal away from the correct phase synchronization.

In this embodiment, the pseudo-random encoding is a non-binary encoding using a binary valued matrix having orthogonal (or nearly orthogonal) rows. The encoding divides and spreads individual symbols of the second digital data stream over multiple symbols of the transmitted signal. The encoding process first divides the unencoded digital data stream into groups of N consecutive bits, where N=2, 3 or 4. Each group of N bits forms a 1×N matrix, which is multiplied by an N×M conversion matrix of binary numbers, preferably −1, +1 but alternatively 0, 1. The number of columns M in the conversion matrix is at least equal to N but may be greater if required for orthogonality or if additional benefits of spread spectrum encoding are also desired. The rows of the conversion matrix are as nearly as possible orthogonal to each other and preferably fully orthogonal. If N=2 or 4, either of a 2-×-2 or 4-×-4 Hadamard matrix is a preferred form of the conversion matrix; and if N=3, a suitable conversion matrix is a pseudo-Hadamard matrix comprising any three rows of a 4×4 Hadamard matrix. The Hadamard matrices are preferred because they are fully orthogonal, but other matrices having nearly orthogonal rows may be sufficient for many applications. The multiplication process proceeds as normal with matrix operations, and the result is a 1-×-M non-binary matrix, since the sums will not be confined to the original binary values.

An example using a known Hadamard matrix of order 4-×-4 is given here:

$$\begin{matrix} 1 & 1 & 1 & 1 \\ 1 & 1 & -1 & -1 \\ 1 & -1 & -1 & 1 \\ 1 & -1 & 1 & -1 \end{matrix}$$

The multiplication of the Hadamard matrix and a sequence of 4 consecutive data bits n (each bit having the possible value of +1 or −1) can produce any of sixteen possible products, with each product comprising four integers each having one of the following integer values: −4, −2, 0, +2, +4:

unencoded

| | | | |
|---|---|---|---|
| −1 | −1 | −1 | −1 |
| −1 | −1 | −1 | +1 |
| −1 | −1 | +1 | −1 |
| −1 | −1 | +1 | +1 |
| −1 | +1 | −1 | −1 |
| −1 | +1 | −1 | +1 |
| −1 | +1 | +1 | −1 |
| −1 | +1 | +1 | +1 |
| +1 | −1 | −1 | −1 |
| +1 | −1 | −1 | +1 |
| +1 | −1 | +1 | −1 |
| +1 | −1 | +1 | +1 |
| +1 | +1 | −1 | −1 |
| +1 | +1 | −1 | +1 |
| +1 | +1 | +1 | −1 |
| +1 | +1 | +1 | +1 | encoded

| | | | |
|---|---|---|---|
| −4 | 0 | 0 | 0 |
| −2 | +2 | +2 | +2 |
| −2 | +2 | −2 | −2 |
| 0 | +4 | 0 | 0 |
| −2 | −2 | −2 | +2 |
| 0 | 0 | 0 | +4 |
| 0 | 0 | −4 | 0 |
| +2 | +2 | −2 | +2 |
| −2 | −2 | +2 | −2 |
| 0 | 0 | +4 | 0 |
| 0 | 0 | 0 | −4 |
| +2 | +2 | +2 | −2 |
| 0 | −4 | 0 | 0 |
| +2 | −2 | +2 | +2 |
| +2 | −2 | −2 | −2 |
| +4 | 0 | 0 | 0 |

Each row in the column entitled "encoded" is a possible encoded data stream derived from a group of four consecutive binary valued (−1, +1) digits. It can be seen that there are five possible values of the encoded stream: −4, −2, 0, +2, +4. Since there are five possible values, they form a non-binary encoded digital data stream. In this digital data stream, the bits n of the original binary data stream have been divided and othogonally combined into the values of the encoded data stream so that each value of the encoded data stream includes a contribution from each of the four bits of the unencoded binary data stream; but the original data stream can be recovered in a lossless manner in a properly programmed receiver.

The total distribution of these five integer values across the 64 possible occurrences in 16 possible outcomes of 4 integers each is the following: "−4" (4 times), "−2" (16 times), "0" (24 times), "+2" (16 times), "+4" (4 times). This distribution approximates a Gaussian (normal) distribution, centered on zero. In addition, the largest absolute values (+4, −4) appear only once in each group of four consecutive values, accompanied by three zeros; and each of the other possible groups contain both positive and negative values of "2". Thus, long runs of identical input bits are prevented from producing corresponding long runs in the encoded data.

Another example is a 2×2 Hadamard matrix of binary values, as in the following example, $$\begin{matrix} 1 & 1 \\ 1 & -1 \end{matrix}$$

produces three possible outcomes with the following distribution: "−2" (one time), "0" (two times), "+2" (one time). This non-binary (three) valued output also appears somewhat Gaussian, centered on zero, and also has a significant percentage of zero values.

Another example is a 3×4 matrix of binary values based on a 4×4 Hadamard matrix, as in the following example, $$\begin{matrix} 1 & 1 & -1 & -1 \\ 1 & -1 & -1 & 1 \\ 1 & -1 & 1 & -1 \end{matrix}$$

produces a non-binary output with four possible values in the following distribution: "−3" (one time), "−1" (three times), "+1" (three times), "+3" (one time). This outcome distribution is also somewhat Gaussian, centered on zero; and, although there are no zero values, the majority of values are either "−1" or "+1", which do not provide a large deviation from the primary modulation.

The previous example points out that sub-matrices derived from Hadamard matrices can be used if they meet certain conditions. The first condition is that the number of rows in the matrix is greater than one: preferably 2, 3 or 4. The second is that each of these rows must be from the same Hadamard matrix. The third is that the number of columns must be at least equal to the number of rows. For example, a 2-×-4 matrix that has two rows selected from a 4-×-4 matrix would meet the conditions. This matrix would have a 1-× 4 product matrix, but each number in the product matrix would have one of three possible values, as with the 2-×-2 Hadamard matrix. Since there are more numbers in the product matrix, it would be spread over more symbols of the first modulation and thus be sent at a lower rate, resulting in coding gain. Likewise, a 4-×-8 matrix having four rows selected from an 8-×-8 Hadamard matrix would meet the definition, and it would have the characteristics of a 4-×-4 Hadamard matrix but result in coding gain. If coding gain is not desired, a true Hadamard matrix (2-×-2 or 4-×-4) should be chosen. Other matrices meeting the requirements stated above will occur to those in the art.

Thus, matrix encoding based on a Hadamard matrix to produce a non-binary data stream for the second modulation is a pseudo-random encoding, and the resulting encoded second digital data, when appearing in a second modulation as offsets from the nominal values of the first modulation, will be interpreted by a receiver not expecting the hierarchical modulation as random noise on the expected first modulation.

Modulation of the above-described example would proceed by providing a secondary modulation of each primary modulation symbol with a simple adjustment of its constellation as described in FIG. 6. For the 4×4 Hadamard matrix, the primary modulated symbols would be taken in groups of four, with each consecutive one of the primary modulated symbols modified by one of the four sums in the next 1-x-M product matrix. The five possible values of each symbol in the non-binary second data stream would each provide a predetermined offset from the nominal QPSK value in each quadrant of the constellation in phase, amplitude or both. For example, in the case of phase, the offset with the value of zero (0) provides an offset of zero degrees from the nominal values shown as points 620, 622, 624 and 626. The negative values (−2, −4) would provide separate spaced offsets in one direction from the corresponding nominal value and the positive values (+2, +4) would likewise provide separate spaced offsets in the opposite direction. The smaller values (−2, +2) could be represented by points 601-608 in the Figure, and the larger values (−4, +4) would be added appropriately as desired. The offsets could be entirely phase offsets or they could be a mixture of phase and amplitude as in a QAM modulation (offsets of amplitude only will not directly affect a legacy receiver expecting a QPSK signal, since they do not produce phase shifts from the expected QPSK constellation values). The other matrices discussed would be modulated similarly, but with fewer deviations from the QPSK modulation of the first data stream. For a 2-x-2 Hadamard matrix, the primary symbols would be taken in groups of two for the 1-x-2 product matrix. For a 3-x-4 pseudo-Hadamard matrix, the primary symbols would be taken four at a time for the 1-x-4 product matrix.

The process of pseudo-random encoding, while giving the second digital data the appearance of random noise over time (Gaussian looking distribution centered on zero, no extended runs, etc.), is nevertheless determinative and therefore reversible by decoding in a properly programmed receiver to recover the second digital data stream(s). But a first digital data stream is not so encoded, so that it maintains compatibility with legacy receivers or other receivers programmed to demodulate the first signal in the manner of a legacy receiver.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method of transmitting digital data in a hierarchical transmission system comprising the steps of:
providing at least a first digital data stream and a second digital data stream;
providing a non-binary, pseudo-random encoding of the second digital data stream but not the first digital data stream, said non-binary, pseudo-random encoding of the second digital data stream comprising consecutive groups of n bits in the second digital data stream, wherein n is one of equal to or greater than two, and creating a n-x-1 matrix and multiplying the same by a predetermined n-x-m matrix of binary numbers, wherein m is at least equal to n and each row of the n-x-m matrix is orthogonal to the other rows thereof, to produce a 1-x-m product matrix of non-binary, pseudo-random numbers;
hierarchically modulating a carrier to produce a signal with a first modulation based on the first digital data stream and a second modulation based on at least the non-binary, pseudo-random encoded second digital data stream; and
transmitting the signal, whereby the transmitted signal when received may be fully demodulated for the second digital data stream or partially demodulated on the first modulation alone for the first digital data stream with the second modulation appearing as pseudo-Gaussian noise.

2. The method of claim 1 further comprising the steps of:
providing at least a third digital data stream;
providing a non-binary, pseudo-random encoding of the third digital data stream; and
further basing the second modulation on the third digital data stream.

3. The method of claim 2 wherein all but the first digital data streams are provided with non-binary, pseudo random encoding and the second modulation is based on the encoded all but the first digital data streams.

4. The method of claim 1 wherein n=2 and the predetermined n-x-m matrix is a 2-x-m matrix comprising 2 orthogonal rows of a Hadamard matrix having at least 2 rows.

5. The method of claim 4 wherein the n-x-m matrix is a 2-x-2 Hadamard matrix.

6. The method of claim 1 wherein n=4 and the predetermined n-x-m matrix is a matrix comprising 4 orthogonal rows of a Hadamard matrix having at least 4 rows.

7. The method of claim 6 wherein the n-x-m matrix is a 4-x-4 Hadamard matrix.

8. The method of claim 1 wherein n=3 and the predetermined n-x-m matrix is a matrix comprising 3 orthogonal rows of a Hadamard matrix having at least 4 rows.

9. The method of claim 8 wherein the Hadamard matrix has 4 rows.

10. The method of claim 1 wherein the step of hierarchically modulating a carrier comprises using each consecutive one of the non-binary numbers of each one of the 1-x-m product matrices to modify a unique, consecutive symbol of a group of m consecutive symbols in the first modulation, whereby each binary bit of a group of n bits in the second digital data stream is divided and spread across the m symbols of the group of symbols in the first modulation that is modulated by the product matrix derived from the group of n bits and the second modulation results in a pseudo-Gaussian modulation of the carrier over time.

11. The method of claim 10 wherein n=2 and the predetermined n-x-m matrix is a 2-x-m matrix comprising 2 orthogonal rows of a Hadamard matrix having at least 2 rows.

12. The method of claim 11 wherein the n-x-m matrix is a 2-x-2 Hadamard matrix.

13. The method of claim 10 wherein n=4 and the predetermined n-x-m matrix is a matrix comprising 4 orthogonal rows of a Hadamard matrix having at least 4 rows.

14. The method of claim 13 wherein the n-x-m matrix is a 4-x-4 Hadamard matrix.

15. The method of claim 10 wherein n=3 and the predetermined n-x-m matrix is a matrix comprising 3 orthogonal rows of a Hadamard matrix having at least 4 rows.

16. The method of claim 15 wherein the Hadamard matrix has 4 rows.

17. The method of claim 1, wherein n=2, 3, or 4.

* * * * *